(12) United States Patent
Yoshizawa et al.

(10) Patent No.: US 11,505,279 B2
(45) Date of Patent: Nov. 22, 2022

(54) BICYCLE MOTORIZATION DEVICE AND WHEEL

(71) Applicant: Panasonic Intellectual Property Management Co., Ltd., Osaka (JP)

(72) Inventors: Jin Yoshizawa, Osaka (JP); Kazuaki Hashimoto, Osaka (JP); Takashi Uchida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 160 days.

(21) Appl. No.: 16/967,981

(22) PCT Filed: Mar. 5, 2019

(86) PCT No.: PCT/JP2019/008585
§ 371 (c)(1),
(2) Date: Aug. 6, 2020

(87) PCT Pub. No.: WO2019/188042
PCT Pub. Date: Oct. 3, 2019

(65) Prior Publication Data
US 2021/0031874 A1 Feb. 4, 2021

(30) Foreign Application Priority Data
Mar. 29, 2018 (JP) .............................. JP2018-066143

(51) Int. Cl.
*B62M 6/65* (2010.01)
*B62M 6/50* (2010.01)
(Continued)

(52) U.S. Cl.
CPC ................ *B62M 6/65* (2013.01); *B62J 43/13* (2020.02); *B62J 45/412* (2020.02); *B62J 45/423* (2020.02);
(Continued)

(58) Field of Classification Search
CPC . B62M 6/65; B62M 6/50; B62M 7/12; B62M 6/45; B62M 6/60; B62J 43/13; B62J 45/412; B62J 45/423; B60L 2200/12
See application file for complete search history.

(56) References Cited

U.S. PATENT DOCUMENTS

2003/0047369 A1    3/2003   Katagiri et al.
2012/0109436 A1    5/2012   Saida
                          (Continued)

FOREIGN PATENT DOCUMENTS

EP          2604499 A1    6/2013
EP          2671788 A1   12/2013
(Continued)

OTHER PUBLICATIONS

Japanese Office Action issued in corresponding Japanese Patent Application No. 2020-509765, dated Jun. 29, 2021, with English translation.

(Continued)

*Primary Examiner* — Kevin Hurley
*Assistant Examiner* — Marlon A Arce
(74) *Attorney, Agent, or Firm* — McDermott Will & Emery LLP

(57) ABSTRACT

A bicycle motorization device is attached to a bicycle. The motorization device includes: a calculation unit configured to calculate speed of the bicycle; an estimation unit configured to estimate pedal force applied to pedals of the bicycle; an electric motor; a battery which supplies electric power to the electric motor; and a control unit configured to apply auxiliary driving force to a wheel of the bicycle by driving the electric motor based on the speed calculated and the pedal force estimated.

5 Claims, 4 Drawing Sheets

(51) Int. Cl.
*B62M 7/12* (2006.01)
*B62J 43/13* (2020.01)
*B62J 45/412* (2020.01)
*B62J 45/423* (2020.01)

(52) U.S. Cl.
CPC .............. *B62M 6/50* (2013.01); *B62M 7/12* (2013.01); *B60L 2200/12* (2013.01)

(56) References Cited

U.S. PATENT DOCUMENTS

| | | | |
|---|---|---|---|
| 2014/0297076 A1* | 10/2014 | Hasegawa | B62K 11/007 701/22 |
| 2016/0347408 A1 | 12/2016 | Guida | |
| 2018/0197401 A1* | 7/2018 | Khaligh | B62M 6/50 |
| 2019/0188235 A1* | 6/2019 | Martinez-Molina | H02P 29/00 |
| 2019/0280628 A1* | 9/2019 | Hosaka | B60T 8/17 |
| 2020/0283092 A1* | 9/2020 | Doerksen | B62K 21/12 |

FOREIGN PATENT DOCUMENTS

| | | |
|---|---|---|
| EP | 2826700 A1 | 1/2015 |
| JP | H7-172372 A | 7/1995 |
| JP | H08-230755 | 9/1996 |
| JP | 2000-280972 A | 10/2000 |
| JP | 2004-25913 | 1/2004 |
| JP | 2009-190443 A | 8/2009 |
| JP | 2014-012525 A | 1/2014 |
| JP | 2014-193683 A | 10/2014 |
| JP | 2015-037896 A | 2/2015 |

OTHER PUBLICATIONS

International Search Report issued in corresponding International Patent Application No. PCT/JP2019/008585, dated May 28, 2019, with English translation.
Naoki Tsukamoto, "EvoWheel turning your bicycle into an electric assist bicycle instantly," MOOVOO, The Asahi Shimbun Company, Mar. 23, 2018, with English translation.
Chinese Office Action dated Oct. 11, 2021, issued in the corresponding Chinese Patent Application No. 201980012251.2, with English translation of Search Report.
Extended European Search Report dated Mar. 18, 2021 issued in corresponding European patent application No. 19775939.2.

* cited by examiner

BICYCLE MOTORIZATION DEVICE AND WHEEL

CROSS-REFERENCE OF RELATED APPLICATIONS

This application is the U.S. National Phase under 35 U.S.C. § 371 of International Patent Application No. PCT/JP2019/008585, filed on Mar. 5, 2019, which in turn claims the benefit of Japanese Application No. 2018-066143, filed on Mar. 29, 2018, the entire disclosures of which Applications are incorporated by reference herein.

TECHNICAL FIELD

The present invention relates to a bicycle motorization device and a wheel.

BACKGROUND ART

Conventionally, electric bicycles that offer easy riding by adding auxiliary driving force generated by an electric motor to man-powered driving force, such as pedal force applied to pedals, have been known. Patent Literature (PTL) 1 discloses an electric bicycle which includes a speed sensor.

CITATION LIST

Patent Literature

PTL 1: Japanese Unexamined Patent Application Publication No. 2014-012525

SUMMARY OF THE INVENTION

Technical Problem

The present invention provides a bicycle motorization device and a wheel which are capable of motorizing a bicycle that does not include an electric motor.

Solutions to Problem

A bicycle motorization device according to an aspect of the present invention is a bicycle motorization device to be attached to a bicycle, the motorization device includes: a calculation unit configured to calculate speed of the bicycle; an estimation unit configured to estimate pedal force applied to pedals of the bicycle; an electric motor; a battery which supplies electric power to the electric motor; and a control unit configured to apply auxiliary driving force to a wheel of the bicycle by driving the electric motor based on the speed calculated and the pedal force estimated.

A wheel according to an aspect of the present invention is a wheel to be attached to a bicycle, the wheel includes: a wheel body; a calculation unit configured to calculate speed of the bicycle; an estimation unit configured to estimate pedal force applied to pedals of the bicycle; an electric motor; a battery which supplies electric power to the electric motor; and a control unit configured to apply auxiliary driving force to the wheel body by driving the electric motor based on the speed calculated and the pedal force estimated.

Advantageous Effect of Invention

According to the present invention, a bicycle motorization device and a wheel which are capable of motorizing a bicycle that does not include an electric motor can be realized.

DESCRIPTION OF EXEMPLARY EMBODIMENTS

Hereinafter, embodiments will be described with reference to the drawings. Note that the embodiments below each describe a general or specific example. The numerical values, shapes, materials, elements, the arrangement and connection of the elements, steps, and the processing order of the steps, etc. presented in the embodiments below are mere examples and do not limit the present invention. Furthermore, among the structural elements in the embodiments below, those not recited in any one of the independent claims representing the most generic concepts will be described as optional structural elements.

Note that the drawings are schematic diagrams, and do not necessarily provide strictly accurate illustration. Furthermore, throughout the drawings, the same reference signs are given to essentially the same structural elements, and redundant descriptions may be omitted or simplified.

Embodiment 1

[Configuration]

Figure 1:
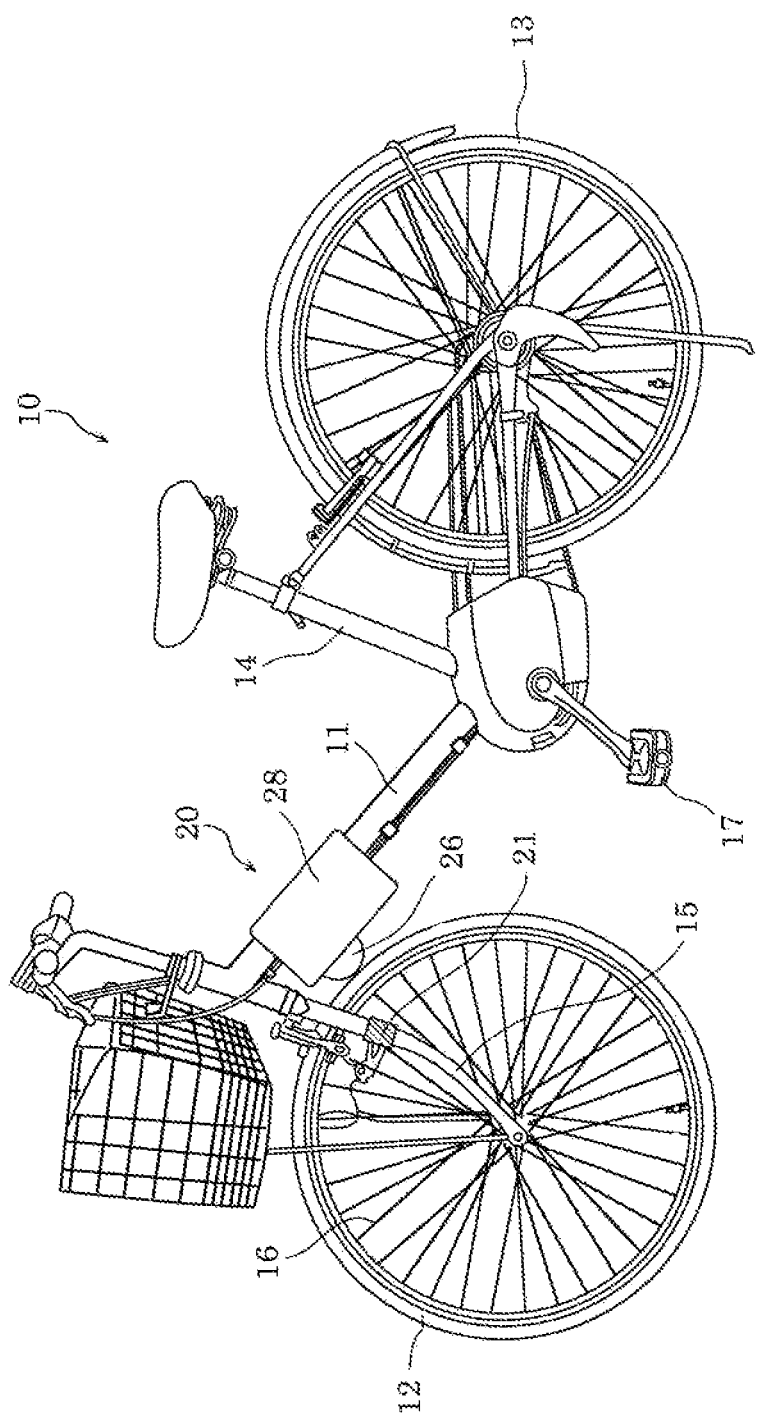
FIG. 1 is a diagram illustrating an external appearance of a bicycle to which a bicycle motorization device according to Embodiment 1 is attached.
Figure 2:
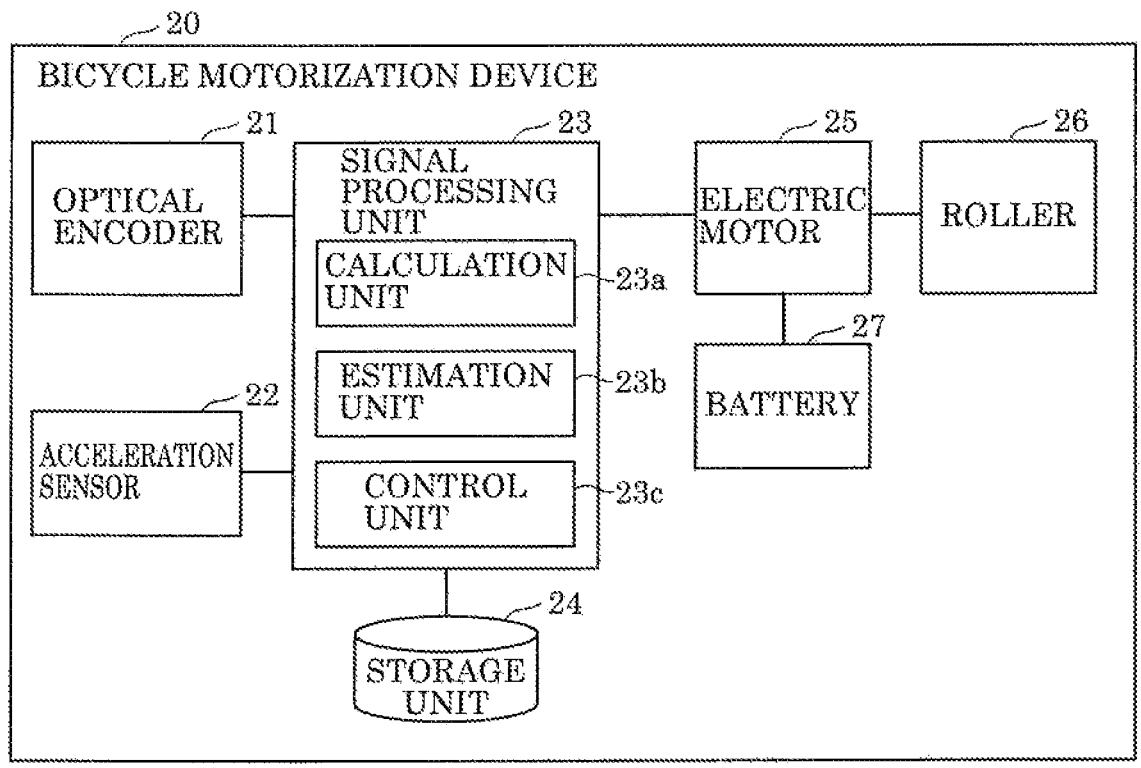
FIG. 2 is a block diagram illustrating a function configuration of the bicycle motorization device according to Embodiment 1.

First, the configuration of a bicycle motorization device according to Embodiment 1 will be described. FIG. 1 is a diagram illustrating an external appearance of a bicycle to which a bicycle motorization device according to Embodiment 1 is attached. FIG. 2 is a block diagram illustrating a function configuration of the bicycle motorization device according to Embodiment 1.

As illustrated in FIG. 1, bicycle motorization device 20 includes an attachment structure for attachment to bicycle 10. Bicycle motorization device 20 is removably attached to bicycle 10 that does not include an electric motor. The attachment structure is a screw fastening structure for which a screw is used, but may be an engagement structure to which a nail, etc. for attachment are used. Bicycle motorization device 20 can motorize bicycle 10 to which bicycle motorization device 20 is attached. Bicycle motorization device 20 is attached to, for example, main frame 11 of bicycle 10, and motorizes front wheel 12 of bicycle 10. Note that bicycle motorization device 20 can be attached to, for example, vertical pipe 14 to motorize rear wheel 13 of bicycle 10.

As illustrated in FIG. 1 and FIG. 2, bicycle motorization device 20 specifically includes optical encoder 21, acceleration sensor 22, signal processing unit 23, storage unit 24, electric motor 25, roller 26, battery 27, and case 28. These structural elements are accommodated in case 28 except for optical encoder 21.

Optical encoder 21 is attached to fork 15 of bicycle 10, and emits light to spoke portion 16 of front wheel 12. Optical encoder 21 is, for example, a reflective encoder, and outputs a modulation signal according to light reflected off spoke portion 16. Optical encoder 21 may be a transmissive encoder. In this case, optical encoder 21 outputs a modulation signal according to light which has passed through spoke portion 16 of front wheel 12. Note that bicycle motorization device 20 may include a magnetic encoder instead of optical encoder 21.

Acceleration sensor 22 detects acceleration, and outputs a signal indicating the acceleration. Acceleration sensor 22 detects acceleration of bicycle 10 in a traveling direction.

Signal processing unit 23 performs signal processing in bicycle motorization device 20, and controls electric motor 25. Signal processing unit 23 specifically includes calculation unit 23a, estimation unit 23b, and control unit 23c. Signal processing unit 23 is realized by a microcomputer, but may be realized by a processor or a dedicated circuit.

Storage unit 24 is a storage device in which a control program, etc. executed by signal processing unit 23 are stored. Specifically, storage unit 24 is realized by a semiconductor memory.

Electric motor 25 is a driving source for motorizing bicycle 10. Electric motor 25 causes roller 26 to rotate using electric power supplied from battery 27.

Roller 26 is in contact with front wheel 12 of bicycle 10. Roller 26 is rotated by electric motor 25 in the aforementioned state to apply auxiliary driving force to front wheel 12. Note that a clutch structure is provided between electric motor 25 and roller 26, for example. Roller 26 spins in the air when no auxiliary driving force is applied to front wheel 12.

Battery 27 is a power source which supplies electric power to electric motor 25. Battery 27 is, for example, a secondary battery (i.e. a storage battery), such as a lithium ion battery.

[Operation]

Figure 3:
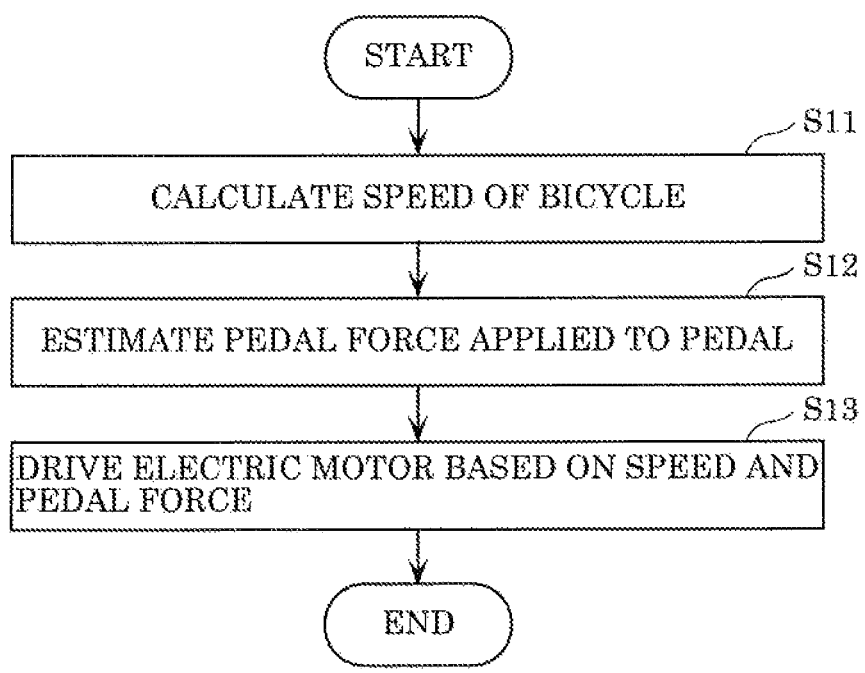
FIG. 3 is a flowchart illustrating operation of the bicycle motorization device according to Embodiment 1.

Bicycle motorization device 20 does not continuously move front wheel 12 of bicycle 10 using electric motor 25, but can add an electric motor assist function to bicycle 10. The electric motor assist function is a function of appropriately applying auxiliary driving force to front wheel 12 of bicycle 10 based on speed of bicycle 10 and pedal force applied to pedals 17. Hereinafter, operation of bicycle motorization device 20 will be described. FIG. 3 is a flowchart illustrating operation of bicycle motorization device 20.

First, calculation unit 23a in signal processing unit 23 calculates speed of bicycle 10 (11). Calculation unit 23a obtains a modulation signal from optical encoder 21. The modulation signal is modulated according to the presence of spokes which constitute spoke portion 16. The modulation signal is a signal which indirectly indicates an amount of rotations (i.e. the number of rotations) of front wheel 12. Calculation unit 23a specifies, based on the modulation signal, the number of the spokes passing in front of optical encoder 21 per unit time, and specifies the amount of rotations of front wheel 12 per unit time based on the number of the spokes specified. Calculation unit 23a can calculate the speed of bicycle 10 based on the amount of rotations of front wheel 12 per unit time and the size of front wheel 12.

Note that the number of the spokes which front wheel 12 includes and the size of front wheel 12, etc. are set based on user operation received via an operation receiving unit (not illustrated) included in bicycle motorization device 20, but may be determined in advance.

Alternatively, a first table information in which the amount of rotations of front wheel 12 per unit time and the speed of bicycle 10 are associated with each other may be stored in storage unit 24. In this case, calculation unit 23a can calculate the speed of bicycle 10 from the amount of rotations of front wheel 12 by referring to the first table information.

Next, estimation unit 23b estimates pedal force applied to pedals 17 of bicycle 10 (S12). The pedal force applied to pedals 17 is, in other words, torque applied to pedals 17. Estimation unit 23b estimates the pedal force applied to pedals 17 based on acceleration (more specifically, a signal indicating the acceleration) of bicycle 10 in a traveling direction. The acceleration is detected by acceleration sensor 22.

It is considered that the acceleration in the traveling direction is large when a user puts extra effort to pedals 17, or in other words, when the pedal force is large. Consequently, estimation unit 23b estimates that the pedal force increases as the acceleration of bicycle 10 in the traveling direction increases.

Storage unit 24 stores, for example, a second table information in which acceleration detected by acceleration sensor 22 and pedal force applied to pedals 17 are associated with each other, and estimation unit 23b estimates pedal force from the acceleration by referring to the second table information. The correlation between the acceleration and the pedal force in the second table information is experimentally or empirically determined in an appropriate manner. In the second table information, pedal force that is associated with acceleration increases as the acceleration increases.

Note that storage unit 24 may store, instead of the second table information, a relational expression (function) indicating the relation between the acceleration and the pedal force. The relation is experimentally or empirically determined in an appropriate manner. The relational expression returns higher values of the pedal force for higher values of the acceleration.

Next, control unit 23c drives electric motor 25 based on the speed calculated in Step S11 and the pedal force estimated in step S12 to apply auxiliary driving force to front wheel 12 of bicycle 10 via roller 26 (813).

Specifically, control unit 23c determines, based on the speed calculated and the pedal force estimated, the amount of auxiliary driving force generated by driving of electric motor 25. When the speed is less than a first threshold (for example, 10 km/h), control unit 23c causes auxiliary driving force that is less than twice the pedal force applied to pedals 17 to generate by driving electric motor 25. When the speed is more than or equal to a second threshold (for example, 24 km/h) that is higher than the first threshold, control unit 23c does not cause electric motor 25 to generate auxiliary driving force. When the speed is more than or equal to the first threshold and less than the second threshold, control unit 23c causes auxiliary driving force to generate according to the speed by driving electric motor 25. Note that the aforementioned ways of applying auxiliary driving force are an example.

Although bicycle motorization device 20 cannot directly measure pedal force applied to pedals 17 since bicycle motorization device 20 is not mechanically connected with pedals 17 of bicycle 10, bicycle motorization device 20 can estimate the pedal force applied to pedals 17. Bicycle motorization device 20 can add the electric motor assist function to bicycle 10 by estimating pedal force applied to pedals 17.

Note that the aforementioned estimation methods of estimating the pedal force are an example. Instead of the acceleration, angular velocity of front wheel 12 may be used for estimating the pedal force. In this case, bicycle motorization device 20 includes an angular velocity sensor which can be attached to front wheel 12, and obtains the angular velocity of front wheel 12 from the angular velocity sensor. Furthermore, in addition to the acceleration, the angular velocity of front wheel 12, the weight of bicycle 10, an equation of state of bicycle 10, etc. may be used for estimating the pedal force. In addition, artificial intelligence (AI) may be used for estimating the pedal force.

Advantageous Effects, Etc.

As has been described above, bicycle motorization device 20 to be attached to bicycle 10 includes: calculation unit 23a which calculates the speed of bicycle 10; estimation unit 23b which estimates pedal force applied to pedals 17 of bicycle 10; electric motor 25; battery 27 which supplies electric power to electric motor 25; and control unit 23c which applies auxiliary driving force to a wheel of bicycle 10 by driving electric motor 25 based on the speed calculated and the pedal force estimated.

Such bicycle motorization device 20 can add the electric motor assist function to bicycle 10 that does not include an electric motor. That is, bicycle motorization device 20 can readily motorize a bicycle that does not include an electric motor. A user can readily motorize bicycle 10 by attaching bicycle motorization device 20 to bicycle 10.

In addition, bicycle motorization device 20 further includes, for example, acceleration sensor 22. Estimation unit 23b estimates the pedal force based on acceleration of bicycle 10 in a traveling direction. The acceleration is detected by acceleration sensor 22.

Such bicycle motorization device 20 can estimate the pedal force using acceleration sensor 22.

In addition, bicycle motorization device 20 further includes, for example, optical encoder 21 which emits light to spoke portion 16 of the wheel. Spoke portion 16 includes a plurality of spokes. Calculation unit 23a calculates the speed of bicycle 10 based on a signal indicating an amount of rotations of the wheel. The signal is outputted by optical encoder 21.

Such bicycle motorization device 20 can calculate the speed of bicycle 10 using optical encoder 21.

In addition, for example, control unit 23c applies the auxiliary driving force to front wheel 12 of bicycle 10.

Such bicycle motorization device 20 can apply auxiliary driving force to front wheel 12 of bicycle 10.

Embodiment 2

[Configuration]

Figure 4:
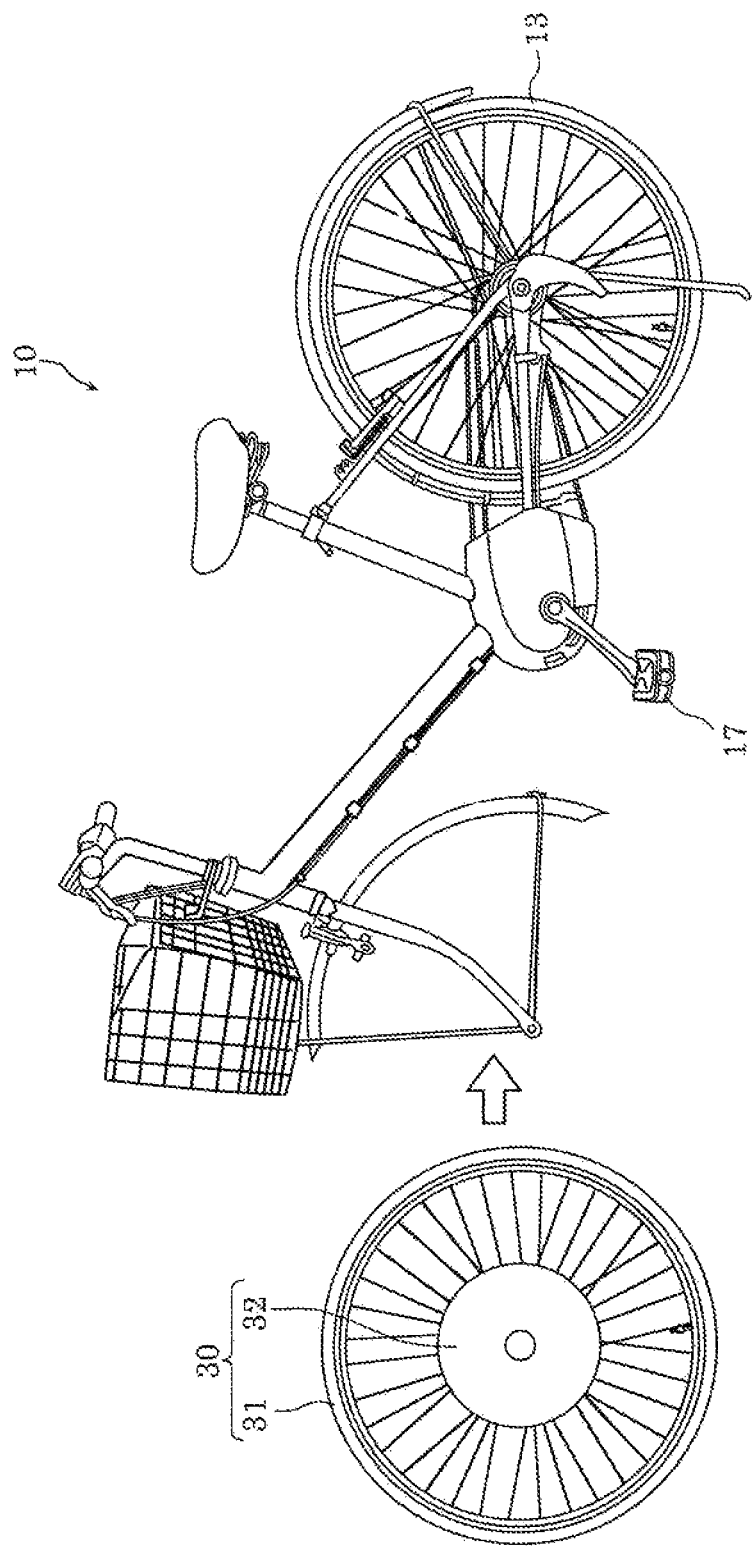
FIG. 4 is a diagram illustrating an external appearance of a wheel according to Embodiment 2.
Figure 5:
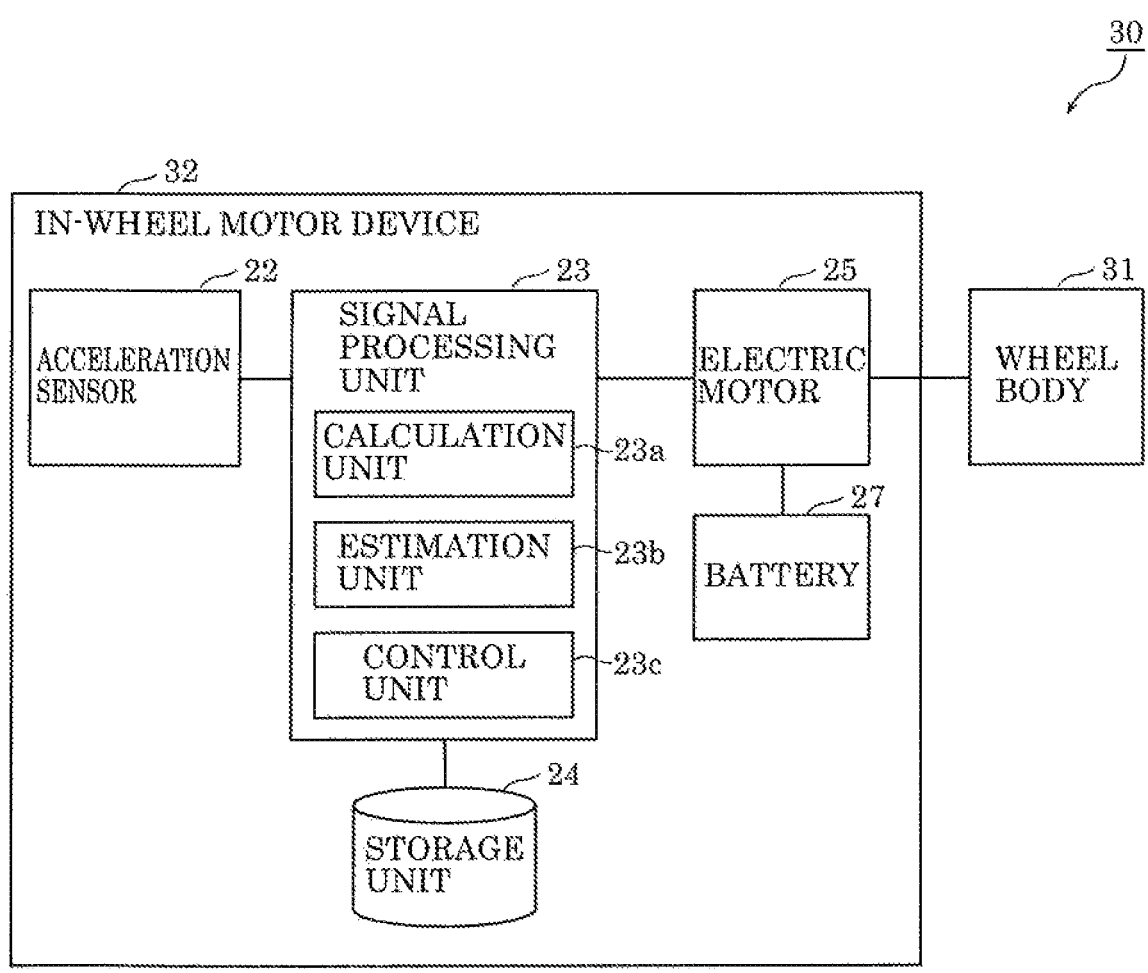
FIG. 5 is a block diagram illustrating a function configuration of the wheel according to Embodiment 2.

Bicycle motorization device 20 may be realized in the form of a wheel of bicycle 10. Hereinafter, a wheel according to Embodiment 2 will be described. FIG. 4 is a diagram illustrating an external appearance of a wheel according to Embodiment 2. FIG. 5 is a block diagram illustrating a function configuration of the wheel according to Embodiment 2. Note that Embodiment 2 mainly describes differences from Embodiment 1. Therefore, descriptions of items that have been previously described will be omitted or simplified in the following Embodiment 2.

As illustrated in FIG. 4, wheel 30 is a device that can motorize bicycle 10 by being attached to bicycle 10 as replacement for a front wheel of bicycle 10 that does not include an electric motor. Wheel 30 includes wheel body 31 and in-wheel motor device 32. Note that wheel 30 may be attached to bicycle 10 as replacement for rear wheel 13 of bicycle 10. Wheel 30 may be used as a front wheel of bicycle 10 or as a rear wheel of bicycle 10.

As illustrated in FIG. 5, in-wheel motor device 32 specifically includes acceleration sensor 22, signal processing unit 23, storage unit 24, electric motor 25, and battery 27.

In in-wheel motor device 32, calculation unit 23a in signal processing unit 23 calculates speed of bicycle 10 based on acceleration detected by acceleration sensor 22. Specifically, calculation unit 23a can calculate the speed of bicycle 10 in a traveling direction by integrating a signal indicating the acceleration of bicycle 10 in the traveling direction. The signal is outputted from acceleration sensor 22. Note that such a calculation method of calculating the speed may be employed by bicycle motorization device 20. In addition, if optical encoder 21 (or a magnetic encoder) is attached to the axis of wheel 30, calculation unit 23a can calculate the speed of bicycle 10 in the traveling direction using the same calculation method described in Embodiment 1.

The estimation method of estimating pedal force by estimation unit 23b is the same as the estimation method employed by bicycle motorization device 20. Control unit 23c drives electric motor 25 based on the speed calculated by calculation unit 23a and the pedal force estimated by estimation unit 23b to apply auxiliary driving force to wheel body 31. The determination method of determining the amount of auxiliary driving force is the same as the method employed by bicycle motorization device 20.

Although wheel 30 cannot directly measure pedal force applied to pedals 17 since wheel 30 is not mechanically connected with pedals 17 of bicycle 10, wheel 30 can estimate the pedal force applied to pedals 17. Wheel 30 can add the electric motor assist function to bicycle 10 by estimating pedal force applied to pedals 17.

Advantageous Effects, Etc.

As has been described above, wheel 30 to be attached to bicycle 10 includes: wheel body 31; calculation unit 23a which calculates speed of bicycle 10; estimation unit 23b which estimates pedal force applied to pedals 17 of bicycle 10; electric motor 25; battery 27 which supplies electric power to electric motor 25; and control unit 23c which applies auxiliary driving force to wheel body 31 by driving electric motor 25 based on the speed calculated and the pedal force estimated.

Such wheel 30 can add the electric motor assist function to bicycle 10 that does not include an electric motor. That is, wheel 30 can motorize bicycle 10 that does not include an electric motor. A user can readily motorize bicycle 10 by replacing a wheel of bicycle 10 with wheel 30.

In addition, wheel 30 is used as, for example, a front wheel of bicycle 10.

Such wheel 30 can add the electric motor assist function to bicycle 10 that does not include an electric motor by being used as a front wheel of bicycle 10. A user can readily motorize bicycle 10 by replacing a front wheel of bicycle 10 with wheel 30.

OTHER EMBODIMENT

Although embodiments have been described as above, the present invention is not limited to the embodiments.

For example, the bicycle motorization device and the wheel according to the embodiments may include a function of regeneratively charging a battery.

Note that general or specific aspects of the present invention may be realized by a system, a device, a method, an integrated circuit, a computer program, or a computer-readable recording medium such as a CD-ROM. The general or specific aspects of the present invention may also be realized by optionally combining a system, a device, a method, an integrated circuit, a computer program, and a recording medium. For example, the present invention may be realized as an in-wheel motor device according to the embodiment. The present invention may be realized as a method of controlling a bicycle including the bicycle motorization device or the wheel.

The present invention also encompasses: embodiments achieved by applying various modifications conceivable to those skilled in the art to each embodiment; and embodiments achieved by optionally combining the structural elements and the functions of each embodiment without departing from the essence of the present invention.

REFERENCE MARKS IN THE DRAWINGS

10 bicycle
12 front wheel
17 pedal
20 bicycle motorization device
21 optical encoder
22 acceleration sensor
23a calculation unit
23b estimation unit
23c control unit
25 electric motor
27 battery
30 wheel
31 wheel body
32 in-wheel motor device

The invention claimed is:

1. A bicycle motorization device to be attached to a bicycle, the motorization device comprising:
 a calculation unit configured to calculate speed of the bicycle;
 an estimation unit configured to estimate pedal force applied to pedals of the bicycle;
 an electric motor;
 a battery which supplies electric power to the electric motor;
 a control unit configured to apply auxiliary driving force to a wheel of the bicycle by driving the electric motor based on the speed calculated and the pedal force estimated; and
 an acceleration sensor, wherein
 the estimation unit is configured to estimate the pedal force based on acceleration of the bicycle in a traveling direction, the acceleration being detected by the acceleration sensor.

2. The bicycle motorization device according to claim 1, wherein
 the control unit is configured to apply the auxiliary driving force to a front wheel of the bicycle.

3. A bicycle motorization device to be attached to a bicycle, the motorization device comprising:
 a calculation unit configured to calculate speed of the bicycle;
 an estimation unit configured to estimate pedal force applied to pedals of the bicycle;
 an electric motor;
 a battery which supplies electric power to the electric motor;
 a control unit configured to apply auxiliary driving force to a wheel of the bicycle by driving the electric motor based on the speed calculated and the pedal force estimated; and
 an optical encoder which emits light to a spoke portion of the wheel, the spoke portion including a plurality of spokes, wherein
 the calculation unit is configured to calculate the speed of the bicycle based on a signal indicating an amount of rotations of the wheel, the signal being outputted by the optical encoder.

4. A wheel to be attached to a bicycle, the wheel comprising:
 a wheel body;
 a calculation unit configured to calculate speed of the bicycle;
 an estimation unit configured to estimate pedal force applied to pedals of the bicycle;
 an electric motor;
 a battery which supplies electric power to the electric motor;
 a control unit configured to apply auxiliary driving force to the wheel body by driving the electric motor based on the speed calculated and the pedal force estimated; and
 an acceleration sensor, wherein
 the estimation unit is configured to estimate the pedal force based on acceleration of the bicycle in a traveling direction, the acceleration being detected by the acceleration sensor.

5. The wheel according to claim 4, wherein the wheel is used as a front wheel of the bicycle.

* * * * *